United States Patent
Hennig et al.

(10) Patent No.: US 6,462,307 B1
(45) Date of Patent: Oct. 8, 2002

(54) PROCESS FOR PRODUCING AN INTENSITY DISTRIBUTION OVER A WORKING LASER BEAM AND A DEVICE FOR THIS PURPOSE

(75) Inventors: Guido Hennig, Wynau; Max Datwyler, Bleienbach, both of (CH)

(73) Assignee: MDC Max Datwyler AG Bleienbach, Bleienbach (CH)

(*) Notice: Subject to any disclaimer, the term of this patent is extended or adjusted under 35 U.S.C. 154(b) by 20 days.

(21) Appl. No.: 09/613,828

(22) Filed: Jul. 11, 2000

(30) Foreign Application Priority Data

Jul. 12, 1999 (EP) .............................. 99810623

(51) Int. Cl.[7] .......................... B23K 26/00; B23K 26/36
(52) U.S. Cl. .................................. 219/121.77
(58) Field of Search ............... 219/121.61, 121.62, 219/121.67, 121.68, 121.69, 121.76, 121.77, 121.85

(56) References Cited

U.S. PATENT DOCUMENTS

| | | |
|---|---|---|
| 4,958,900 A | 9/1990 | Ortiz, Jr. |
| 5,279,775 A | 1/1994 | Thomas et al. |
| 5,386,221 A | 1/1995 | Allen et al. |
| 5,856,648 A | 1/1999 | Frauchiger et al. |
| 6,002,100 A * | 12/1999 | Etsion .................. 219/121.71 |

FOREIGN PATENT DOCUMENTS

DE     A1-4212390     10/1993

* cited by examiner

*Primary Examiner*—Samuel M. Heinrich

(57) ABSTRACT

In a process for producing a stipulated intensity distribution of a working laser beam on an object surface, at least one first and one second component beam with a stipulated first and second intensity distribution are formed and the power of each component beam is changed in a controlled manner with switching times down to submicroseconds. The component beams at a third intensity distribution superimposed as the working beam are pointed at or into the object in order to achieve a different action as a result of a varied third intensity distribution of the working beam. In contrast to conventional processes the first intensity distribution $I_b = a \times f_b(x, y, t)$ differs from the following one $I_n = a \times f_n(x, y, t)$ by the value of the function $f_n(x, y, t)$ and no longer only by an altered linear value $a$. The process as claimed in the invention can be preferably used in the production of screen cells on an engraved cylinder.

19 Claims, 2 Drawing Sheets

PROCESS FOR PRODUCING AN INTENSITY DISTRIBUTION OVER A WORKING LASER BEAM AND A DEVICE FOR THIS PURPOSE

The invention relates to a process as claimed in the preamble of claim 1 and a device as claimed in the preamble of claim 6.

PRIOR ART

The intensity distribution of a material machining laser beam on a tool surface has for a long time been adjusted with focussing lenses of varied focal distance. The-imaging of laser beams can be described with Gaussian beam theory. In simplified terms it can be stated here: The wider a collimated laser beam striking a focussing lens, the smaller its focal diameter and the shorter its focussing depth. The intensity distribution on a tool surface to be machined was thus adjusted in the past by a suitable choice of a focussing lens with a corresponding preceding beam widening.

By a suitable choice of so-called mode diaphragms at the "correct" location in the laser resonator moreover the generated laser mode was changed. A mode diaphragm with a small cross section yielded a fundamental mode while mode diaphragms with a large opening yielded a wide multimode beam.

When high powers were used, laser beams of several lasers were combined coaxially on top of one another. Thus the intensity distribution on a tool surface to be machined could be changed only by changes in the optical structure. If a high speed intensity change was to be carried out, using optical switching elements such as Pockels cells (electro-optical effect), Faraday rotators (magneto-optical effect) or by acousto-optical modulators only the entire radiated-in power could be changed. In doing so however only attenuation over the entire beam cross section took place. The relative intensity distribution over the focussed beam section was thus preserved, aside from the diffraction effects and spatial distortions. The intensity distribution consisted of a numerical factor and a local function [1=a×f(x,y)], and only the numerical factor [a] could be changed in the known processes.

OBJECT OF THE INVENTION

The object of the invention is to devise a process and a device with which the curve shape of a an intensity distribution of a laser beam at the machining site can be quickly changed, i.e. with switching times down to submicroseconds. A change of the curve shape of the intensity distribution cannot be done simply by attenuation of the entire material machining beam; this would yield the same curve shape again except for diffraction effects and distortions. The object of the invention is to change no longer only the numerical factors in the intensity distribution, but also the value of the function:

$$I_1 \approx a \times f_1(x, y, t); I_2 = a \times f_2(x, y, t)$$

Of course the linear factor a can also be varied.

ACHIEVING THE OBJECT

The object is achieved by at least two component beams with different intensity distribution being used and being combined into one working beam. This working beam is then directed preferably focussed on the surface of an object for machining. In contrast to conventional methods, at this point the first intensity distribution $I_b = a \times f_b(x, y, t)$ differs from the following one $I_n = a \times f_n(x, y, t)$ by the value of the function $f_n(x, y, t)$ and no longer only by an altered linear value a. Here x and y are the coordinates of a plane, preferably over the beam cross section, and t is a time function.

Because the intensity of the component beams is changed individually, when the beams are combined no longer does a linear change of the curve shape of the intensity distribution take place, but the curve shape changes as a whole. A change of the curve shape, as indicated below, yields different drilling behavior depending on whether the intensity of the center of the machining beam or on the edge of the beam is increased.

As claimed in the invention at least two component beams $I_1 \approx a_1 \times f_1(x, y, t)$ and $I_2 = a_2(x, y, t)$ are combined, and the factors $a_1$ and $a_2$ can be changed with switching times (change times) down to submicroseconds. The combination of the two beams $\Sigma I_2 + I_2$ then yields a working beam with a different function $f_3(x, y, t)$ of the intensity distribution over the beam cross section. In this way the diameter of the working beams can be "promptly" controlled. Thus, on a workpiece to be machined not only does an adjustable intensity profile arise, but also an adjustable or definable depth sharpness profile.

The invention can be used to advantage wherever material must be removed with a depth and width which change rapidly in space. One preferred application is the production of screen cells on an engraved cylinder. Screen cell production using laser radiation is known from WO 96/34718. But in the known process an intensity distribution was used as can be achieved by focussing a single beam. The advantageous intensity distribution which can be adjusted almost at will, as achieved by the invention by combining several beams, was unknown to WO 96/34718.

With the device described below the component beams can be turned on and off or partially turned on and off at different times. That is, not only is a rapid variation of the intensity of the intensity distribution over the beam cross section possible, but also a time variation: $\Sigma I_2 + I_2 + \ldots = \Sigma f_{a1}(t) \times f_1(x, y, t) + f_{a2}(t) \times f_2(x, y, t)$. This type of variation will be used wherever brief heat-up effects (for example, formation of a plasma cloud) are important.

Material removal is not essential for the use of the invention: use is also possible in laser inscribing without the removal of material and also in material hardening. In addition, objects can also be illuminated (for example modulated pumping of laser crystals or media). Pulsed or also continuously operating laser beams can be used.

EMBODIMENTS OF THE INVENTION

Examples of the process as claimed in the invention and the device as claimed in the invention are detailed below using the figures. Other advantages of the invention follow from the text of the specification below.

Figure 1:
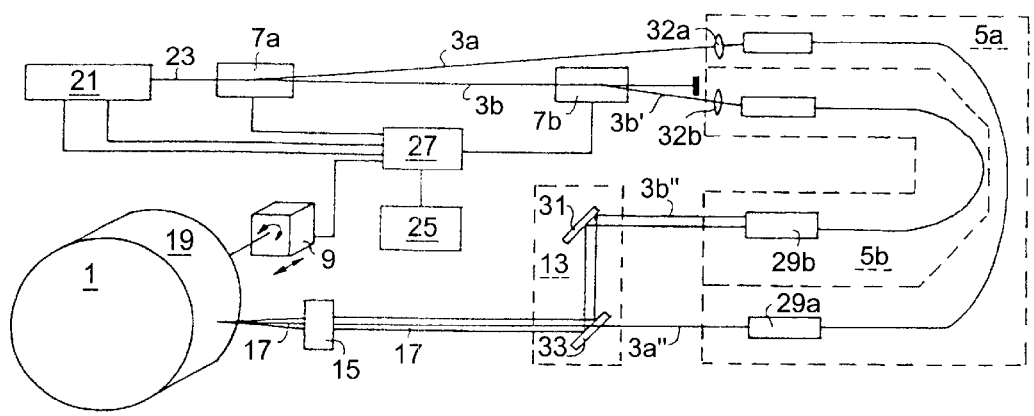
FIG. 1 shows a schematic of the device as claimed in the invention.

The device as claimed in the invention which is shown in FIG. 1 is used here for example to produce screen cells on an engraved cylinder 1; in the device there are two component laser beams 3a and 3b, one beam profile shaping means Sa and 5b for each component beam 3a and 3b respectively, two power setting means 7a and 7b for the component beams 3a and 3b, one positioning means 9 for a workpiece 11 to be machined, specifically an engraved cylinder, and a combination means 13 for the two component beams 3a and 3b and one focussing means 15 for the components beams 3a and 3b which have been combined into the material machining beam in order to focus them on the surface 19 of the engraved cylinder 1 to be machined.

Furthermore, the device has a periodic Q-switch Nd-YAG laser 21 as the radiation source. The laser 21 emits a source beam 23 with an adjustable repetition frequency of up to 70 kHz. The repetition frequency of the periodic Q-switch laser 21 is produced with an acousto-optical modulator which is located within the laser resonator and which is not shown. The acousto-optical modulator within the laser resonator, the two power setting means 7a and 7b, the positioning means 9 and the laser power supply to the laser 21, not shown, are electrically connected via signal lines to a control means 27 which has a memory 25.

The pulsed laser beam 23 proceeding from the laser 21 is divided into the two component beams 3a and 3b with a power setting means which is made as an acousto-optical modulator 7a. Depending on the amplitude of the acoustic wave which is excited in the modulator crystal—only the amplitude, but not the frequency is changed—the incoming radiation power is divided between the two component beams 3a and 3b. Radiation of power in the component beams of higher order, i.e. at a larger angle, can be ignored. The component beam 3b is routed to another acousto-optical modulator 7b as the power setting means. But this modulator relays only a single component beam 3b'. That is, the power of the component beam 3b' relative to the coupled-in power of the component beam 3b is attenuated as a function of the acoustic modulation deviation.

U.S. Pat. No. 5,856,648 in contrast to the invention taught overall intensity adjustment per laser pulse by means of an acousto-optical modulator and time internesting of two pulse sequences of two laser beams into one beam with a single pulse series with twice the pulse frequency and without overlapping of pulses. Two laser devices were used, each with an output beam which was brought to an intensity to be stipulated using an acousto-optical modulator and which was deflected by a fixed angle. The two acousto-optical modulators were arranged such that the beam axis of the deflected beams coincided. i.e. the second (looking in the direction of beam propagation) of the two modulators was penetrated by a beam deflected by the first modulator in an activationless state. The arrangement in U.S. Pat. No. 5,856,648 was used to combine the radiation of two pulsed lasers such that in the radiationless state of the one laser the radiation of the second was "inserted". But in the invention, in contrast, two beams with adjustable intensity are formed from a single laser beam. The teaching of U.S. Pat. No. 5,856,648 is alien to that of the invention.

Figure 2:
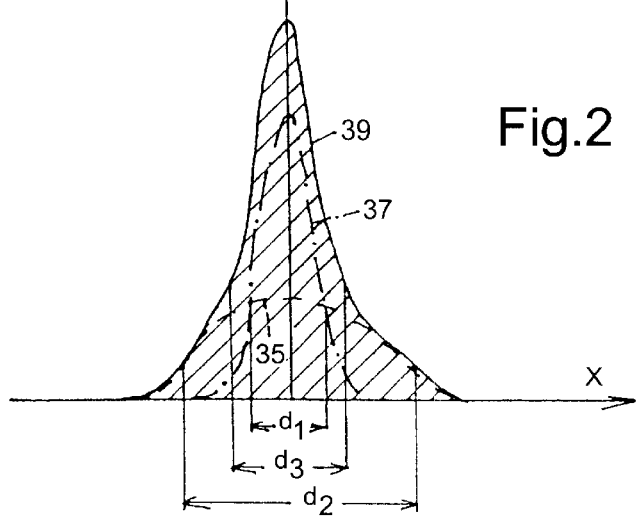
FIG. 2 shows a sample intensity distribution of two combined coaxial component beams.

The beam profiles of the two component beams 3a and 3b' are shaped differently when coupled into one beam guide 30a and 30b at a time by its coupling optics 32a and 32b and its optical decoupling system 29a and 29b which emits the decoupled beam collimated, differently shaped, such that the component beam 3a acquires a wide beam diameter and the component beam 3b' acquires a narrow beam diameter. Beam shaping can at this point be done by the radiation guides (single mode fiber; multimode fiber; use with fibers with different doping profile) or the refractive or diffractive optical systems 29a and 29b which adjoin the fiber end for decoupling, or by both. The component beams 3a" and 3b" which are decoupled from the radiation guides 30a and 30b using the optical systems 29a and 29b are collimated. The optical systems 29a and 29b are preferably made such that the beam diameter of the component beam 3a" is much smaller than that of the component beam 3b". Depending on the optical system 29a and 29b used, then the depth sharpness of each component beam is different when focussing on the surface 19. The component beam 3b" is guided with a deflection mirror 31 by 90° to a superposition mirror 33. The deflection mirror 31 and the superposition mirror 33 form the combination means 13 for the two component beams 3a" and 3b". Here combination takes place geometrically optically (in contrast to "physical" combination in which a polarizing beam splitter or partially transparent mirror are used; this likewise would be possible within the framework of the process as claimed in the invention, but would entail a power loss of 50%). For this reason the mirror 33 has a center hole through which the component beam 3a" can pass unhindered. The component beam 3b" is deflected reflecting by 90° by the mirror surface which surrounds the hole. At this point both component beams 3a" and 3b" are combined coaxially into the material machining beam 17 which is focussed with the focussing means on the surface 19 of the engraved cylinder 1. The narrow component beam 3a" according to the intensity distribution curve 35 which is shown in FIG. 2 by the broken line with a relative large focal diameter $d_2$ and the component beam 3b" according to the intensity distribution curve 37 which is shown by the dot-dash line with a small focal diameter $d_1$ are imaged on the surface by focussing. The edge of the focal point is defined by a drop of the intensity to 1/e-th part of the maximum value. The component beam 3a" with the large focal diameter $d_2$ requires a power as large as possible. When the component beams 3a" and 3b" are combined the component beam 3a" with the large power should be completely transmitted. For the small focal point (after focussing by the focussing means 15), in the production of the screen cells a fraction of the power contained in the component beam 3b" is enough. The middle area which is not available for reflection (passage hole for the beam 3a") of the deflection mirror 33 can therefore be ignored. The intensity distributions which are shown by the broken line and the dot-dash line are determined only by computation; experimentally they can only be plotted individually. For material machining, i.e. for producing the pertinent screen cell the intensity distribution 39 in FIG. 2 is decisive for the combined component beams 3a" and 3b" with focal diameter $d_3$.

Depending on the power profile setting of the component beams 3a and 3b, cells with a variable diameter of 10 microns to 180 microns with a variable hole depth up to 50 microns at an aspect ratio (hole depth to hole diameter) of up to 2 can be produced on the engraved cylinder 1 per laser pulse. In particular, with suitable triggering of the modulators 7a and 7b also purely diameter-variable (i.e. constant in depth) gravure cells can be produced. "Suitable" means that the power of the component beam 3a is reduced and at the same time that of the component beam 3b is increased such that in spite of decreasing cell diameters the same cell depth is always obtained. The control of the two modulators 7a and 7b is experimentally determined for this purpose. The resulting cell diameter is measured. The experimental values are deposited in the memory 25.

To produce the screen cells on the engraved cylinder 1 the required screen point data are stored in the memory 25 of the control means. The control means 27 at this point, depending on the material-used for the engraved cylinder 1, controls the pump power of the laser 21 and its acousto-optical modulator which is located in the resonator. The triggering of this modulator determines the repetition frequency of the pulses of the laser beam 23 and thus yields an unequivocal assignment for control of the other two acousto-optical modulators 7a and 7b and of the positioning of the engraved cylinder 1 with the positioning means 9. The acoustic wave in each modulator is in the megahertz range. Switching of the modulators 7a and 7b is thus extremely fast relative to the repetition frequency of the laser (max. 70 kHz) and thus setting of the corresponding power data of each component beam to each laser pulse is possible. The power of the component beam 3a depends on the power delivered by the laser 21 and the power portion overcoupled into the component beam 3b. This overcoupled power portion can be reduced then by the acousto-optical modulator 7b controlled by the control means 27.

Depending on the set power ratios, compared to FIG. 2 a different superposition curve for the intensity profile at the focal point on the engraved cylinder surface arises. If the profile of the component beams to be superimposed is to be changed, the two component beams or even only one need be changed in the beam profile shaping means 5a and 5b. This can be done by variation of the optical system (lens system 29a and 29b). Also other beam guides for example with a different core diameter or another doping profile can be used.

The beam guides 30 and 30b can be abandoned, resulting in simpler beam guidance simply by the lens systems. The radiation guides 30a and 30b were used here to be able to keep vibrations of the positioning means 9 away from the optical system.

Instead of allowing the thin component beam 3a" to pass through the hole in the deflection mirror for the "thick" component beam, a different beam combination can be chosen in which in the middle of the "thick" component beam which now runs straight a small deflection mirror is used for the now vertically incident "thin" component beam.

A plane-parallel inclined plate can also be used as the combining element for the two beams. The plate is provided on each side with an antireflecting coating and only in the middle of one of its surfaces which is optically facing the engraved cylinder to be machined does it bears a reflecting coating. The diameter of the reflecting coating is matched to the diameter of the thin beam. Preferably the plate is set at 45° to the axis of the "large" beam. This beam penetrates the plate with losses which are caused by the reflection coating and a small lateral offset which is caused by the plate thickness and plate tilt. The "small beam" runs perpendicularly to the axis of the "large" beam and is reflected (superimposed) into the large beam parallel to the beam axis by the reflective coating which preferably has the beam axis of the large beam in its center.

Instead of producing the two component beams 3a and 3b from a single laser beam 23, the component beams can also be produced by two separate Q-switch lasers with internal Q-switch modulators which then would have to be synchronized by the control means 27.

FIG. 2 shows a coaxial combination of two component beams by way of example. Instead of the two component beams 3a and 3b of course also several component beams can be combined into a single material machining beam with a stipulated intensity characteristic. Then another intensity increase in the beam center or beam broadening with an intensity rise in the edge areas of the beam can be achieved. Other beams can be produced by using other optical switching elements, for example by the above described acousto-optical modulators.

Figure 3A:
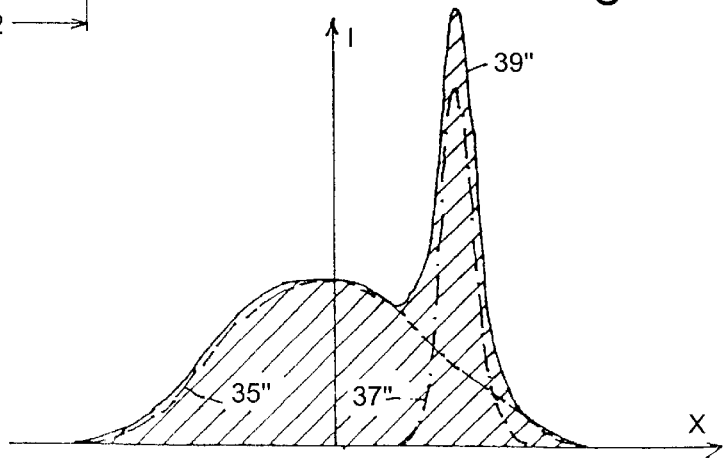
FIG. 3 shows analogously to FIG. 2 the intensity distributions of combined component beams which do not run parallel in the combination means and thus after focussing completely (a) or only partially (b) overlap and are spaced completely apart from one another (c) and FIG. 4 shows an arrangement with two lasers.
Figure 3B:
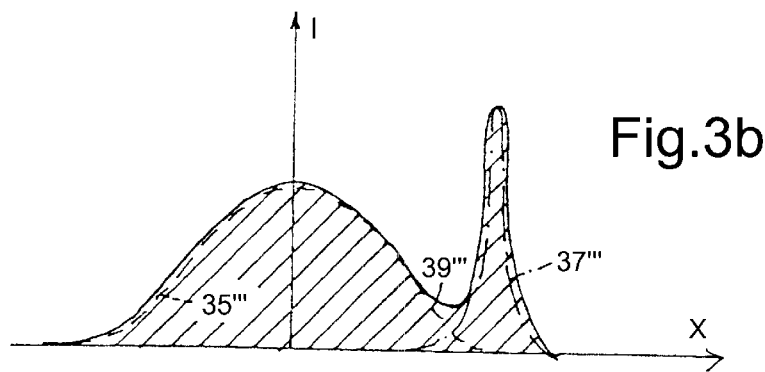
Figure 3C:
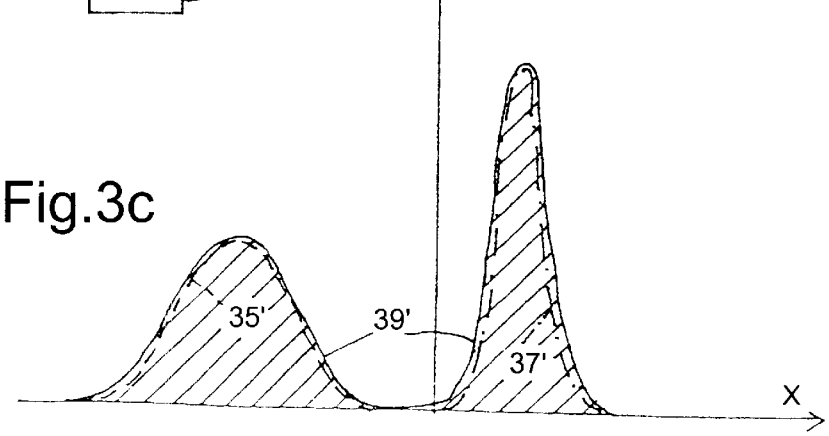

Instead of a coaxial (central) combination of the component beams, a non-coaxial combination and also a combination of non-parallel running component beams can be carried out (FIGS. 3a to 3c), and the focussed component beams can completely (FIG. 3a) or partially (FIG. 3b) overlap or can be completely separated from one another (FIG. 3c). Component beams which are not parallel to one another are obtained for example by slight tilting of the deflection mirror 31. Instead of a deflection mirror which can be adjusted for example using an adjustment screw, a so-called galvanometer mirror can also be used which can be adjusted by an electric drive. One such arrangement will be chosen when recesses [holes or blind holes (for example screen cells)] with an unround cross section are to be produced. For component beams which are completely spatially separated from one another, depending on the number of component beams, several recesses with a different aspect ratio can also be produced. Depending on the calibration of the component beams then for example gravure screens with small intermediate points can be produced between the large cells to increase the print density and to improve the color flow behavior.

The optical axis of the above cited component beams is always perpendicular to the surface 19 to be worked; but it can also lie deviating from the vertical, and then the optical axes of individual component beams can have different angles.

Instead of changing the power of the above described component beams 3a and 3b to produce a stipulated intensity profile which varies overtime with the-power setting means 7a and 7b, they can also (additionally, if desired) undertake different, high speed power profile shaping over time. Thus a low power characteristic can follow a high initial pulse. To do this, for pulsed laser radiation shortly before incidence of the split pulse, in the beam characteristic 3b the acousto-optical modulator 7b would be completely opened for the beam and would be partially closed then within the pulse after a given time. The pulse start could also be reduced. In the combined state of the component beams in this way a locally-dependent time variation of the intensity profile is obtained.

The deflection mirror 31 can also be made as a so-called adaptive mirror. With the mirror alone then the beam profile of the component beam 3b can be promptly changed.

Instead of an acousto-optical modulator (for beam splitting or attenuation) also an electro-optical modulator (Pockels cell) or a magneto-optical modulator (Faraday rotator) can be used. These latter two switching elements however work in contrast to the acousto-optical switching element with polarized radiation.

To produce a screen cell at this point only one laser pulse at a time or also several laser pulses per cell can be used.

Instead of moving the workpiece, the combination means 13 with the focussing means 15 can also be moved; this is easily possible as a result of laser power feed via the radiation guides 30a and 30b. But also only the engraved cylinder can be turned and the combination means 13 with the focussing means 15 moved axially.

The laser pulse frequency for producing the aforementioned printing cells can also be specifically increased for example by using not only one pulsed laser, but several. The individual pulses of the laser devices which have a time interval can then be specifically connected to an analog arrangement as is described in U.S. Pat. No. 5,855,648 and combined into a beam with stipulated, now increased pulse rates.

Figure 4:
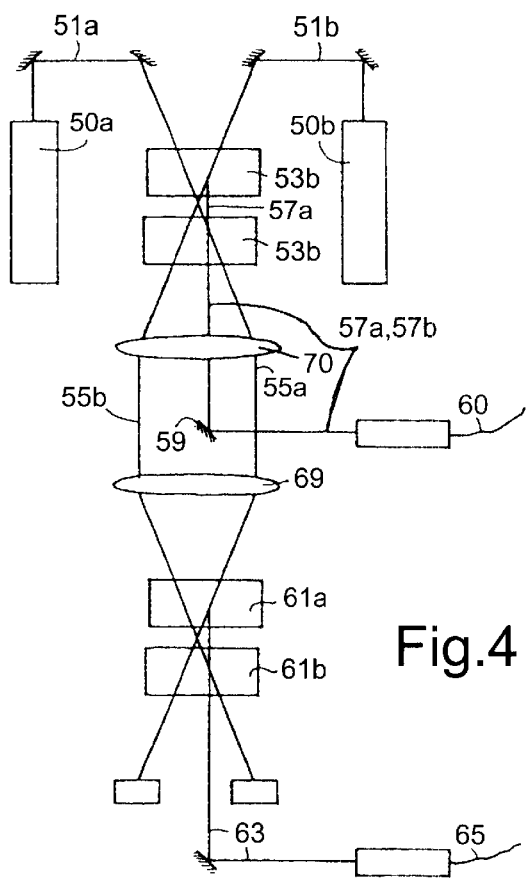

FIG. 4 shows an arrangement with two lasers 50a and 50b. The two lasers 50a and 50b emit pulsed laser source beams 51a and 51b, with pulses which are offset in time to one another. The two source beams 51a and 51b are deflected such that at a stipulated angle they are incident on two successive acousto-optical modulators 53a and 53b. The stipulated angle corresponds to the deflection angle of the first order, generated with the modulator 53a or 53b respectively turned on. If neither modulator 53a and 53b is turned on, the beams 51a and 51b penetrate the two modulators 53a and 53b in an unchanged direction and continue to run separately as beams 55a and 55b. If one modulator 53a or 53b has been turned on, deflection takes place and according to the level of the modulation deviation the corresponding coupling of energy into the deflected beam 57a and 57b which is between the two beams 55a and 55b takes place. The two modulators 53a and 53b which are synchronized with the laser pulses are arranged such that the beam of the modulator 53a deflected at the time and that of 53b have the same optical axis. Both beams 57a and 57b are deflected with a small deflection mirror 58 and are coupled into a radiation guide fiber 60. In the radiation guide 60 thus the beam components of the two beams 51a and 51b are guided. The beams 55a and 55b which still have only part of the radiation energy of the beams 51a and 51b are routed to two other modulators 61a and 61b with which combination of beams 55a and 55b into one beam 63 analogous the what has just been described is done. The beam 63 is likewise coupled into a beam guide 65. The radiation guided into the beam guides 60 and 65 can be further used analogously to the structure as shown in FIG. 1 as the beam 3b" and 3a".

What is claimed is:

1. A process for producing a stipulated intensity distribution of a working laser beam on an object surface or in an object, characterized in that at least one first and one second component beam with a stipulated first and second intensity distribution are formed from only one source beam and the power of each component beam is changed in a controlled manner with switching times in the submicroseconds, and the component beams at a third intensity distribution superimposed as the working beam are pointed at the object surface or into the object in order to achieve a different action as a result of a varied third intensity distribution of the working beam.

2. The process as claimed in claim 1, wherein a first beam of a pulsed laser is split with a first acousto-optical modulator into a first and a second component beam with a component power which is adjustable by the first modulator, the first component beam is shaped to a stipulated beam diameter with a stipulated intensity distribution over its cross section, the second component beam is power- modulated with a second acousto-optical modulator and shaped to a likewise stipulated beam diameter with a stipulated intensity distribution which can differ from that or those of the first component beam, the two component beams are combined into a material machining beam and are focussed on the material surface, the location of the radiation focussing is changed according to a stipulated number of pulses of the laser, the local change and the intensity of the first and second component beams being changed in a controlled manner with the two modulators such that on the material surface a series of cells with different aspect ratios is formed so that a surface machined in this way as part of a roller, is used as an engraved cylinder.

3. The process as claimed in claim 1, wherein the radiation of all component beams are emitted from the pertinent radiation source and are combined into a single working beam, the combined beam is pointed at the object surface or into the object.

4. The process as claimed in claim 3, wherein the radiation of all component beams are emitted coincident in time from the pertinent radiation source.

5. The process as claimed in claim 3, wherein the radiation of all component beams are combined at least spatially superimposed in part into said single working beam.

6. The process as claimed in claim 3, wherein the radiation of all component beams are combined in part into said single working beam by geometrical superposition.

7. The process as claimed in claim 3, wherein said combined beam is pointed focussed at the object surface or into the object.

8. The process as claimed in claim 3, wherein said combined beam is pointed at the object surface or into the object and the location in or on the object is continually changed.

9. The process as claimed in claim 1, wherein the time power characteristic of the radiation of at least one component beam is changed in a controlled manner in time with switching times in the sub-microseconds.

10. The process as claimed in claim 1, wherein the intensity of each component beam is changed by the corresponding electrical triggering of an optical switching means.

11. The process as claimed in claim 10, wherein the optical switching means includes an electro-optical or magneto-optical element.

12. The process as claimed in claim 11, wherein at least one of said elements of said optical switching means splits the beam into at least two component beams.

13. The process as claimed in claim 1, wherein a beam profile of each component beam before their combination is shaped into a given profile in order to obtain the stipulated intensity distribution, the intensity distribution differs fundamentally from that of each individual beam and can be varied with switching times in the sub-microseconds without mechanical movement of the optical components.

14. The process as claimed in claim 13, wherein said stipulated intensity distribution is obtained with subsequent focussing and said intensity distrubution differs fundamentally from that of each individual focussed beam.

15. A device for producing an intensity distribution of a working beam on or in an object, comprising:

a least one radiation source for generating at least two component beams with a beam splitter, a beam profile shaping unit for at least one of the component beams;

at least one power setting means for switching in the sub-microseconds for at least one component beam;

a unit for combining the component beams into a working beam; and a positioning means for positioning the working beam.

16. A device as claimed in claim 15 further comprising focussing means for focussing the working beam onto or into the object.

17. A device as claimed in claim 15, wherein the radiation source is a periodically pulsed Q-switch laser for producing a source beam, the beam splitter also acts as the power setting means, with the beam splitter the source beam is dividable into two component beams in a controlled manner such that each component beam per laser pulse has a stipluated power, and another power setting means for setting the power of the radiation of one of the two component beams.

18. A device as claimed in claim 17, wherein said beam splitter acts as an acousto-optical modulator.

19. The device as claimed in claim 15, further comprising:
- a control means with a memory, screen information is stored in the memory for the pixels of a gravure screen;
- an engraved cylinder having a surface which is the workpiece surface to be machined, an electrical connection of the control means is connected to each power setting means for power control of the component beams for each radiation pulse in order to obtain per screen point to be generated on the engraved cylinder, and
- a predefinable radiation cross section and/or a time intensity profile of the working beam on the workpiece surface is the object surface for material removal with a predefinable aspect ratio.

* * * * *